US008937992B2

(12) United States Patent
Cooper et al.

(10) Patent No.: US 8,937,992 B2
(45) Date of Patent: Jan. 20, 2015

(54) METHOD AND APPARATUS FOR UPDATING EQUALIZATION COEFFICIENTS OF ADAPTIVE PRE-EQUALIZERS

(75) Inventors: Michael J. Cooper, Augusta, GA (US); Charles S. Moore, Langhorne, PA (US); John L. Moran, Uxbridge, MA (US); Marc L. Morrissette, Plainville, MA (US); Robert J. Thompson, Monroeton, PA (US)

(73) Assignee: General Instrument Corporation, Horsham, PA (US)

( * ) Notice: Subject to any disclaimer, the term of this patent is extended or adjusted under 35 U.S.C. 154(b) by 578 days.

(21) Appl. No.: 13/221,531

(22) Filed: Aug. 30, 2011

(65) Prior Publication Data
US 2013/0051442 A1 Feb. 28, 2013

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .... *H04L 25/03006* (2013.01); *H04L 25/03885* (2013.01)
USPC ...... 375/232; 375/296; 455/114.2; 455/114.3

(58) Field of Classification Search
CPC ............... H04N 7/102; H04B 1/123; H04B 2001/0425; H04B 1/62; H04B 2001/0433; H04B 10/0795; H04B 10/2507; H04L 27/368; H03F 2201/3233; H03F 1/3241
USPC ................................. 375/296, 297, 229–236; 455/114.2–114.3
See application file for complete search history.

(56) References Cited

U.S. PATENT DOCUMENTS 3,838,221 A 9/1974 Schmidt et al.
4,245,342 A 1/1981 Entenman
(Continued)

FOREIGN PATENT DOCUMENTS

EP 0905998 A2 3/1999
EP 1235402 A2 8/2002
(Continued)

OTHER PUBLICATIONS

Popper, Ambroise et al, "An Advanced Receiver with Interference Cancellation for Broadband Cable Networks", Juniper Networks, International Zurich Seminar on Broadband Communications Access 2002, pp. 23-1-23-6.
(Continued)

*Primary Examiner* — Curtis Odom
(74) *Attorney, Agent, or Firm* — Stewart M. Wiener (57) ABSTRACT

A method and apparatus for updating equalization coefficients of an adaptive pre-equalizer of a network element are provided. The method includes monitoring a communications channel to measure distortion of a communications signal received from the network element and detecting whether a transient impairment is present in the communication signal. When a transient impairment is not detected to be present, a pre-equalization coefficient update is transmitted to the network element. However, when a transient impairment is detected to be present, at least selected ones of the pre-equalization coefficients are scaled before the update is transmitted to the network element or the update is withheld from being transmitted to the network element. An apparatus is also disclosed.

12 Claims, 7 Drawing Sheets

(56) References Cited

U.S. PATENT DOCUMENTS

| | | | |
|---|---|---|---|
| 4,385,392 | A | 5/1983 | Angell et al. |
| 4,811,360 | A | 3/1989 | Potter |
| 4,999,787 | A | 3/1991 | McNally et al. |
| 5,228,060 | A | 7/1993 | Uchiyama |
| 5,251,324 | A | 10/1993 | McMullan |
| 5,271,060 | A | 12/1993 | Moran et al. |
| 5,278,977 | A | 1/1994 | Spencer et al. |
| 5,347,539 | A | 9/1994 | Sridhar et al. |
| 5,390,339 | A | 2/1995 | Bruckert et al. |
| 5,463,661 | A | 10/1995 | Moran et al. |
| 5,532,865 | A | 7/1996 | Utsumi et al. |
| 5,557,603 | A | 9/1996 | Barlett et al. |
| 5,606,725 | A | 2/1997 | Hart |
| 5,631,846 | A | 5/1997 | Szurkowski |
| 5,692,010 | A | 11/1997 | Nielsen |
| 5,694,437 | A | 12/1997 | Yang et al. |
| 5,732,104 | A | 3/1998 | Brown et al. |
| 5,790,523 | A | 8/1998 | Ritchie et al. |
| 5,862,451 | A | 1/1999 | Grau et al. |
| 5,867,539 | A | 2/1999 | Koslov |
| 5,870,429 | A | 2/1999 | Moran et al. |
| 5,886,749 | A | 3/1999 | Williams et al. |
| 5,939,887 | A | 8/1999 | Schmidt et al. |
| 5,943,604 | A | 8/1999 | Chen et al. |
| 6,032,019 | A | 2/2000 | Chen et al. |
| 6,061,393 | A | 5/2000 | Tsui et al. |
| 6,108,351 | A | 8/2000 | Hardy et al. |
| 6,154,503 | A | 11/2000 | Strolle |
| 6,229,792 | B1 | 5/2001 | Anderson et al. |
| 6,230,326 | B1 | 5/2001 | Unger et al. |
| 6,233,274 | B1 | 5/2001 | Tsui et al. |
| 6,240,553 | B1 | 5/2001 | Son et al. |
| 6,272,150 | B1 | 8/2001 | Hrastar et al. |
| 6,278,730 | B1 | 8/2001 | Tsui et al. |
| 6,308,286 | B1 | 10/2001 | Richmond et al. |
| 6,310,909 | B1 | 10/2001 | Jones |
| 6,321,384 | B1 | 11/2001 | Eldering |
| 6,330,221 | B1 | 12/2001 | Gomez |
| 6,334,219 | B1 | 12/2001 | Hill et al. |
| 6,377,552 | B1 | 4/2002 | Moran et al. |
| 6,385,773 | B1 | 5/2002 | Schwartzman et al. |
| 6,389,068 | B1 | 5/2002 | Smith et al. |
| 6,434,583 | B1 | 8/2002 | Dapper et al. |
| 6,445,734 | B1 | 9/2002 | Chen et al. |
| 6,456,597 | B1 | 9/2002 | Bare |
| 6,459,703 | B1 | 10/2002 | Grimwood et al. |
| 6,477,197 | B1 | 11/2002 | Unger |
| 6,480,469 | B1 | 11/2002 | Moore et al. |
| 6,483,033 | B1 | 11/2002 | Simoes et al. |
| 6,498,663 | B1 | 12/2002 | Farhan et al. |
| 6,512,616 | B1 | 1/2003 | Nishihara |
| 6,526,260 | B1 | 2/2003 | Hick et al. |
| 6,546,557 | B1 | 4/2003 | Ovadia |
| 6,556,239 | B1 | 4/2003 | Al Araji et al. |
| 6,556,562 | B1 | 4/2003 | Bhagavath et al. |
| 6,556,660 | B1 | 4/2003 | Li et al. |
| 6,559,756 | B2 | 5/2003 | Al Araji et al. |
| 6,563,868 | B1 | 5/2003 | Zhang et al. |
| 6,570,394 | B1 | 5/2003 | Williams |
| 6,570,913 | B1 | 5/2003 | Chen |
| 6,574,797 | B1 | 6/2003 | Naegeli et al. |
| 6,588,016 | B1 | 7/2003 | Chen et al. |
| 6,606,351 | B1 | 8/2003 | Dapper et al. |
| 6,611,795 | B2 | 8/2003 | Cooper |
| 6,646,677 | B2 | 11/2003 | Noro et al. |
| 6,650,698 | B1* | 11/2003 | Liau et al. .................... 375/229 |
| 6,662,135 | B1 | 12/2003 | Burns et al. |
| 6,662,368 | B1 | 12/2003 | Cloonan et al. |
| 6,671,334 | B1 | 12/2003 | Kuntz et al. |
| 6,687,632 | B1 | 2/2004 | Rittman |
| 6,690,655 | B1 | 2/2004 | Miner et al. |
| 6,700,875 | B1 | 3/2004 | Schroeder et al. |
| 6,700,927 | B1 | 3/2004 | Esliger et al. |
| 6,711,134 | B1 | 3/2004 | Wichelman et al. |
| 6,741,947 | B1 | 5/2004 | Wichelman et al. |
| 6,748,551 | B2 | 6/2004 | Furudate et al. |
| 6,757,253 | B1 | 6/2004 | Cooper et al. |
| 6,772,388 | B2 | 8/2004 | Cooper et al. |
| 6,772,437 | B1 | 8/2004 | Cooper et al. |
| 6,775,840 | B1 | 8/2004 | Naegel et al. |
| 6,816,463 | B2 | 11/2004 | Cooper et al. |
| 6,839,829 | B1 | 1/2005 | Daruwalla et al. |
| 6,853,932 | B1 | 2/2005 | Wichelman et al. |
| 6,877,166 | B1 | 4/2005 | Roeck et al. |
| 6,895,043 | B1 | 5/2005 | Naegeli et al. |
| 6,895,594 | B1 | 5/2005 | Simoes et al. |
| 6,906,526 | B2 | 6/2005 | Hart et al. |
| 6,928,475 | B2 | 8/2005 | Schenkel et al. |
| 6,944,881 | B1 | 9/2005 | Vogel |
| 6,961,314 | B1 | 11/2005 | Quigley et al. |
| 6,961,370 | B2 | 11/2005 | Chappell |
| 6,967,994 | B2 | 11/2005 | Boer et al. |
| 6,973,141 | B1 | 12/2005 | Isaksen et al. |
| 6,985,437 | B1 | 1/2006 | Vogel |
| 6,999,408 | B1 | 2/2006 | Gomez |
| 7,002,899 | B2 | 2/2006 | Azenkot et al. |
| 7,010,002 | B2 | 3/2006 | Chow et al. |
| 7,017,176 | B1 | 3/2006 | Lee et al. |
| 7,032,159 | B2 | 4/2006 | Lusky et al. |
| 7,039,939 | B1 | 5/2006 | Millet et al. |
| 7,050,419 | B2 | 5/2006 | Azenkot et al. |
| 7,054,554 | B1 | 5/2006 | McNamara et al. |
| 7,058,007 | B1 | 6/2006 | Daruwalla et al. |
| 7,072,365 | B1 | 7/2006 | Ansley |
| 7,079,457 | B2 | 7/2006 | Wakabayashi et al. |
| 7,099,412 | B2 | 8/2006 | Coffey |
| 7,099,580 | B1 | 8/2006 | Bulbul |
| 7,139,283 | B2 | 11/2006 | Quigley et al. |
| 7,142,609 | B2 | 11/2006 | Terreault et al. |
| 7,152,025 | B2 | 12/2006 | Lusky et al. |
| 7,158,542 | B1 | 1/2007 | Zeng et al. |
| 7,164,694 | B1 | 1/2007 | Nodoushani et al. |
| 7,177,324 | B1 | 2/2007 | Choudhury et al. |
| 7,197,067 | B2 | 3/2007 | Lusky et al. |
| 7,222,255 | B1 | 5/2007 | Claessens et al. |
| 7,227,863 | B1 | 6/2007 | Leung et al. |
| 7,242,862 | B2 | 7/2007 | Saunders et al. |
| 7,246,368 | B1 | 7/2007 | Millet et al. |
| 7,263,123 | B2 | 8/2007 | Yousef |
| 7,274,735 | B2 | 9/2007 | Lusky et al. |
| 7,295,518 | B1 | 11/2007 | Monk et al. |
| 7,315,573 | B2 | 1/2008 | Lusky et al. |
| 7,315,967 | B2 | 1/2008 | Azenko et al. |
| 7,400,677 | B2 | 7/2008 | Jones |
| 7,421,276 | B2 | 9/2008 | Steer et al. |
| 7,451,472 | B2 | 11/2008 | Williams |
| 7,492,703 | B2 | 2/2009 | Lusky et al. |
| 7,554,902 | B2 | 6/2009 | Kim et al. |
| 7,573,884 | B2 | 8/2009 | Klimker et al. |
| 7,573,935 | B2 | 8/2009 | Min et al. |
| 7,584,298 | B2 | 9/2009 | Klinker et al. |
| 7,616,654 | B2 | 11/2009 | Moran et al. |
| 7,650,112 | B2 | 1/2010 | Utsumi et al. |
| 7,672,310 | B2 | 3/2010 | Cooper et al. |
| 7,684,315 | B1 | 3/2010 | Beser |
| 7,684,341 | B2 | 3/2010 | Howald |
| 7,693,090 | B1 | 4/2010 | Kimpe |
| 7,716,712 | B2 | 5/2010 | Booth et al. |
| 7,739,359 | B1 | 6/2010 | Millet et al. |
| 7,742,697 | B2 | 6/2010 | Cooper et al. |
| 7,742,771 | B2 | 6/2010 | Thibeault |
| 7,760,624 | B1 | 7/2010 | Goodson et al. |
| 7,778,314 | B2 | 8/2010 | Wajcer et al. |
| 7,787,557 | B2 | 8/2010 | Kim et al. |
| 7,792,183 | B2 | 9/2010 | Massey et al. |
| 7,856,049 | B2 | 12/2010 | Currivan et al. |
| 7,876,697 | B2 | 1/2011 | Thompson et al. |
| 7,953,144 | B2 | 5/2011 | Allen et al. |
| 7,970,010 | B2 | 6/2011 | Denney et al. |
| 8,000,254 | B2 | 8/2011 | Thompson et al. |
| 8,037,541 | B2 | 10/2011 | Montague et al. |
| 8,040,915 | B2 | 10/2011 | Cummings |
| 8,059,546 | B2 | 11/2011 | Pai et al. |
| 8,081,674 | B2 | 12/2011 | Thompson et al. |

(56) References Cited

U.S. PATENT DOCUMENTS

| | | |
|---|---|---|
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0071516 A1* | 3/2008 | Cioffi et al. .................... 703/21 |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0003372 A1* | 1/2009 | Popper et al. .................. 370/442 |
| 2009/0031384 A1 | 1/2009 | Brooks et al. |
| 2009/0103557 A1 | 4/2009 | Hong et al. |
| 2009/0109877 A1 | 4/2009 | Murray et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2011/0007788 A1* | 1/2011 | Cendrillon et al. ........... 375/222 |
| 2011/0026571 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0110415 A1 | 5/2011 | Cooper et al. |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |

FOREIGN PATENT DOCUMENTS

| | | |
|---|---|---|
| EP | 1341335 A2 | 9/2003 |
| EP | 1956782 A1 | 8/2008 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2007046876 A1 | 4/2007 |
| WO | 2009146426 A1 | 12/2009 |

OTHER PUBLICATIONS

Popper, Ambroise et al, Ingress Noise Cancellation for the Upstream Channel in Broadband Cable Access Systems, Juniper Networks, (56) References Cited

OTHER PUBLICATIONS

IEEE International Conference on Communications 2002, vol. 3, pp. 1808-1812.
Cable Television Laboratories Inc., "Proactive Network Maintenance Using Pre-Equalization", DOCSIS Best Practices and Guidelines, CM-GL-PNMP-V01-100415, Apr. 15, 2010.
Cable Television Laboratories, Inc., "A Simple Algorithm for Fault Localization Using Naming Convention and Micro-reflection Signature," Invention Disclosure 60193, 2 pages, Jun. 2008.
Cable Television Laboratories, Inc., "Data-Over-Cable Service Interface Specifications DOCSIS 3.0: MAC and Upper Layer Protocols Interface," CM-SP-MULPIv3.0-I16-110623, section 8, pp. 242-266, Jun. 2011.
Cable Television Laboratories, Inc., "Data-Over-Cable Service Interface Specifications DOCSIS® 3.0—MAC and Upper Layer Protocols Interface Specification," CM-SP-MULPIv3.0-I17-111117, Nov. 2011.
Cable Television Laboratories, Inc., "Pre-Equalization Based Proactive Network Maintenance Process Model for CMs Transmitting on Multiple Upstream Channels," Invention Disclosure 60203, 2 pages, May 2009.
Cable Television Laboratories, Inc., "Pre-Equalization based proactive network maintenance process model", Invention Disclosure 60177, 2 pages, Jun. 2008.
Cable Television Laboratories, Inc., "DOCSIS® Best Practices and Guidelines: Proactive Network Maintenance Using Pre-equalization," CM-GL-PNMP-V02-110623, Jun. 2011.
Cable Television Laboratories, Inc., "Data-Over-Cable Service Interface Specifications: DOCSIS 2.0 Radio Frequency Interface Specification," CM-SP-RFIv2.0-I06-040804, Apr. 2004.
L.A. Campos, et al., "Pre-equalization based Pro-active Network Maintenance Methodology", Cable Television Laboratories, Inc., presentation, 32 pages, 2008.
R.L. Howald, et al., "Customized Broadband—Analysis Techniques for Blended Multiplexes," NCTA Technical Papers, 2002.
R. Howald, "Access Networks Solutions: Introduction to S-CDMA," Presentation to Society of Cable Telecommunications Engineers (SCTE) South Florida Chapter, 2009.
R. Howald, "Upstream Snapshots & Indicators (2009)," Regional Samples, Presentation to Society of Cable Telecommunications Engineers (SCTE) South Florida Chapter, Jan. 2010.
R.L. Howald et al., "Characterizing and Aligning the HFC Return Path for Successful DOCSIS 3.0 Rollouts", SCTE Cable-Tec Expo, Oct. 2009.
R. Howald, et al., "DOCSIS 3.0 Upstream: Readiness & Qualification," SCTE Cable-Tec Expo, Oct. 2009.
R. Howald, et al., "The Grown-Up Potential of a Teenage PHY", NCTA Convention and Exposition, May 2012.
R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.
R. Hranac, "Linear Distortions, Part 1," Communication Technology, Jul. 2005.
X. Liu, et al., "Variable Bit Rate Video Services in DOCSIS 3.0 Networks," NCTA Technical Papers, 2008.
Motorola, Inc., "White Paper: Expanding Bandwidth Using Advanced Spectrum Management," Sep. 25, 2003.
H. Newton, Newton's Telecom Dictionary, Flatiron Publishing, 9th ed., pp. 216 and 1023 (definitions of "carrier to noise ratio" and "signal to noise ratio"), Sep. 1995.
M. Patrick, et al., "Delivering Economical IP Video over DOCSIS by Bypassing the M-CMTS with DIBA," SCTE 2007 Emerging Technologies, NCTA Technical Papers, 2007.
S.U.H. Qureshi, "Adaptive Equalization," Proceedings of the IEEE, vol. 73, No. 9, pp. 1349-1387, Sep. 1985.
S. Ramakrishnan, "Scaling the DOCSIS Network for IPTV," SCTE Conference on Emerging Technologies, NCTA Cable Show, Apr. 2009.
Y.R. Shelke, "Knowledge Based Topology Discovery and Geo-localization", Thesis, Master of Science, Ohio State University, 2010.
R. Thompson, et al., "256-QAM for Upstream HFC," NCTA 2010 Spring Technical Forum Proceedings, pp. 142-152, May 2010.
R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable & Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.
B. Volpe, et al., "Cable-Tec Expo 2011: Advanced Troubleshooting in a DOCSIS © 3.0 Plant," Nov. 2011.
L. Wolcott, "Modem Signal Usage and Fault Isolation," U.S. Appl. No. 61/301,835, filed Feb. 5, 2010.
F. Zhao, et al., "Techniques for minimizing error propagation in decision feedback detectors for recording channels," IEEE Transactions on Magnetics, vol. 37, No. 1, pp. 592-602, Jan. 2001.
Y. Morishita, et al., "An LMS adaptive equalizer using threshold in impulse noise environments", IEEE, ICT 2003 10th International Conference on Telecommunications, vol. 1, pp. 578-582, Feb. 2003.
PCT Search Report & Written Opinion, Re: Application #PCT/US2012/049685, Mar. 1, 2013.

* cited by examiner

METHOD AND APPARATUS FOR UPDATING EQUALIZATION COEFFICIENTS OF ADAPTIVE PRE-EQUALIZERS

FIELD

Methods and apparatus for providing equalization between communication devices are described, and more particularly, equalization methods and apparatus that counter the potentially destabilizing effects of impulse noise and like temporary impairments are described.

BACKGROUND

Equalization permits communication devices communicating with one another via communication signals on a communication channel to compensate for linear distortion impairments experienced with the communication signals on the communication channel. Examples of linear distortion impairments include micro-reflections (a short time delay echo or reflection caused by an impedance mismatch), group delay variation (a difference in propagation time where some frequency components of a signal may arrive before others), in band amplitude ripple/tilt (a non-flat frequency response), and the like.

Adaptive equalizers can be utilized to compensate for linear distortion impairments. The adaptive equalizers accomplish equalization by developing a digital filter that reverses or negates the affects of the linear distortion and that has approximately the opposite complex frequency response of the channel through which a desired signal is transmitted. An example of a communication system that may use equalization techniques and adaptive equalizers is a conventional cable modem system.

A typical cable modem system includes a network providing point-to-multipoint topology for supporting data communication between a Cable Modem Termination System (CMTS) at the cable headend and multiple cable modems at the customer premises. The headend is a central facility that is used for receiving, processing, and combining broadcast, narrowcast and other signals to be carried on the cable network. In such systems, information is broadcast downstream from the CMTS at the headend to the cable modems as a continuous transmitted signal in accordance with a time division multiplexing (TDM) technique. In contrast, information is transmitted upstream from each of the cable modems to the CMTS as short burst signals in accordance with a time division multiple access (TDMA) technique.

The upstream transmission of data from the cable modems is managed by the CMTS, which allots to each cable modem specific slots of time within which to transfer data. Conventional cable modem systems utilize DOCSIS-compliant equipment and protocols to carry out the transfer of data packets between multiple cable modems and the CMTS. The term DOCSIS (Data Over Cable System Interface Specification) refers to a group of specifications that define industry standards for cable headend and cable modem equipment.

Within the DOCSIS standard, the upstream transmission (from the subscriber premises toward the network and CMTS) is a burst type of communication and the linear distortion affecting each communication is unique to each subscriber site/modem. As a result, the CMTS of such a system must adapt its adaptive equalizer to match the unique characteristics of each subscriber's transmission. This process is referred to as "post-equalization" and requires longer preamble transmissions for burst type upstream transmissions prior to the actual data passing for the post-equalization to be effective. The longer preambles result in increased overhead.

The DOCSIS specification permits the increased overhead demanded by post-equalization to be countered and reduced by providing for a "pre-equalization" process. Pre-equalization is a process by which the CMTS communicates a unique digital filter to an adaptive pre-equalizer of each subscriber modem. The adaptive pre-equalizer is a circuit or the like in the subscriber modem that pre-equalizes or pre-distorts upstream signals transmitted by the modem to compensate for expected and pre-measured linear impairments. Accordingly, the adaptive pre-equalizer of the modem utilizes the digital filter information provided by the CMTS to enhance any successive upstream transmissions from the modem to the CMTS. The subscriber modem is then able to send its data bursts without the overhead of the long preamble.

The pre-equalization process requires the CMTS at the headend to measure and estimate the distortion of communication signals received from each subscriber modem and to then determine unique filter equalization coefficients for each modem needed to compensate for the measured distortion. Thereafter, the unique filter equalization coefficient or a subsequent update thereof is relayed to each modem to update equalization coefficient settings of the adaptive pre-equalizer of the particular modem. The digital filter created is then applied to all future burst communication signals transmitted by the modem to the CMTS until the modem receives an update or a further update from the CMTS. In this manner, linear distortion of communication signals is properly compensated and the signals received by the CMTS require less or no post-equalization.

A problem can arise with the above referenced pre-equalization process when equalization coefficients or updates thereof are improperly determined by the CMTS due to impulse noise or like transient impairment present on the communication channel when the CMTS measures and determines distortion experienced on the communications channel. During the CMTS measurement process, a temporary impairment such as impulse noise or the like can significantly corrupt the digital filter that is derived by the CMTS and that is subsequently sent to the subscriber modem. If this occurs, any subsequent data transmissions from the modem will have errors due to the use of improper equalization coefficients and possibly all communications may be lost between the CMTS and modem requiring re-registration of the modem.

Communication techniques have been derived with respect to minimizing the effects of impulse noise; however, these techniques are directed to correcting the data burst transmission through various coding schemes. For example, Reed-Solomon Forward Error Correction (RS FEC) is a method of error detection and correction in which redundant information is sent with a data payload in order to allow the receiver to reconstruct the original data should an error occur during transmission. This type of correction occurs at a higher layer in the communications stack above the physical layer. In contrast, equalization occurs at the physical layer (i.e., the actual signal communications step). When considering corruption by a temporary event such as impulse noise, algorithms such as RS FEC or coding gain (achieved with spread communication technologies such as SCDMA) can be used to correct the affects of the single unique event upon the single data transmission. However, in the case of technologies such as pre-equalization where measurements are taken to derive a compensation filter for subsequent future transmissions, often many subsequent data transmissions, the affect of that one temporary noise event may subsequently destroy many more data transmissions.

SUMMARY

This disclosure describes a method of updating equalization coefficients of an adaptive pre-equalizer of a network element. The method includes monitoring a communications channel to measure distortion of a communications signal received from the network element and determining whether a transient impairment is present in the communication signal. When a transient impairment is determined not to be present, the method includes a step of transmitting pre-equalization coefficients in the form of an update to the network element. However, when a transient impairment is determined to be present, the method includes scaling the pre-equalization coefficients before transmitting the pre-equalization coefficient update to the network element. The above referenced steps are performed by an electronic communications device having an equalizer unit.

This disclosure also describes a method in which a communications channel is monitored to measure distortion of a communication signal received from a network element and to determine whether a transient impairment is present in the communication signal as received. When a transient impairment is determined not to be present, a pre-equalization coefficient update is transmitted to the network element. When a transient impairment is determined to be present, transmission of the pre-equalization coefficient update is modified or withheld. The steps of monitoring, determining, modifying, transmitting and/or withholding are performed by an electronic communications device having an equalizer unit.

This disclosure further describes apparatus for communicating with a network element and for transmitting a pre-equalization coefficient update to the network element. The apparatus includes an equalizer module configured to determine pre-equalization coefficients for the network element from measurements of distortion taken by the apparatus from a communications signal received from the network element. The apparatus is configured to determine whether a transient impairment is present in the communication signal. The apparatus is also configured to transmit the pre-equalization coefficient update to the network element in a normal state of operation when a transient impairment is not present, and the apparatus is configured to withhold or modify the pre-equalization coefficients, including but not limited to scaling the pre-equalization coefficients with a scaling factor of less than one before transmitting a pre-equalization coefficient update to the network element or withholding from transmitting the pre-equalization coefficient update to the network element in an impaired state of operation when a transient impairment is determined to be present.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As discussed above, equalization permits communication devices communicating with one another via communication signals on a communication channel to compensate for linear distortion impairments to which the communication signals are subject on the communication channel. One of the communication devices may have an adaptive equalizer as discussed above and another may have an adaptive pre-equalizer. While many different communication systems and devices may utilize such equalization techniques, FIG. 1 illustrates one such system by way of example, and not by way of limitation.

Figure 1:
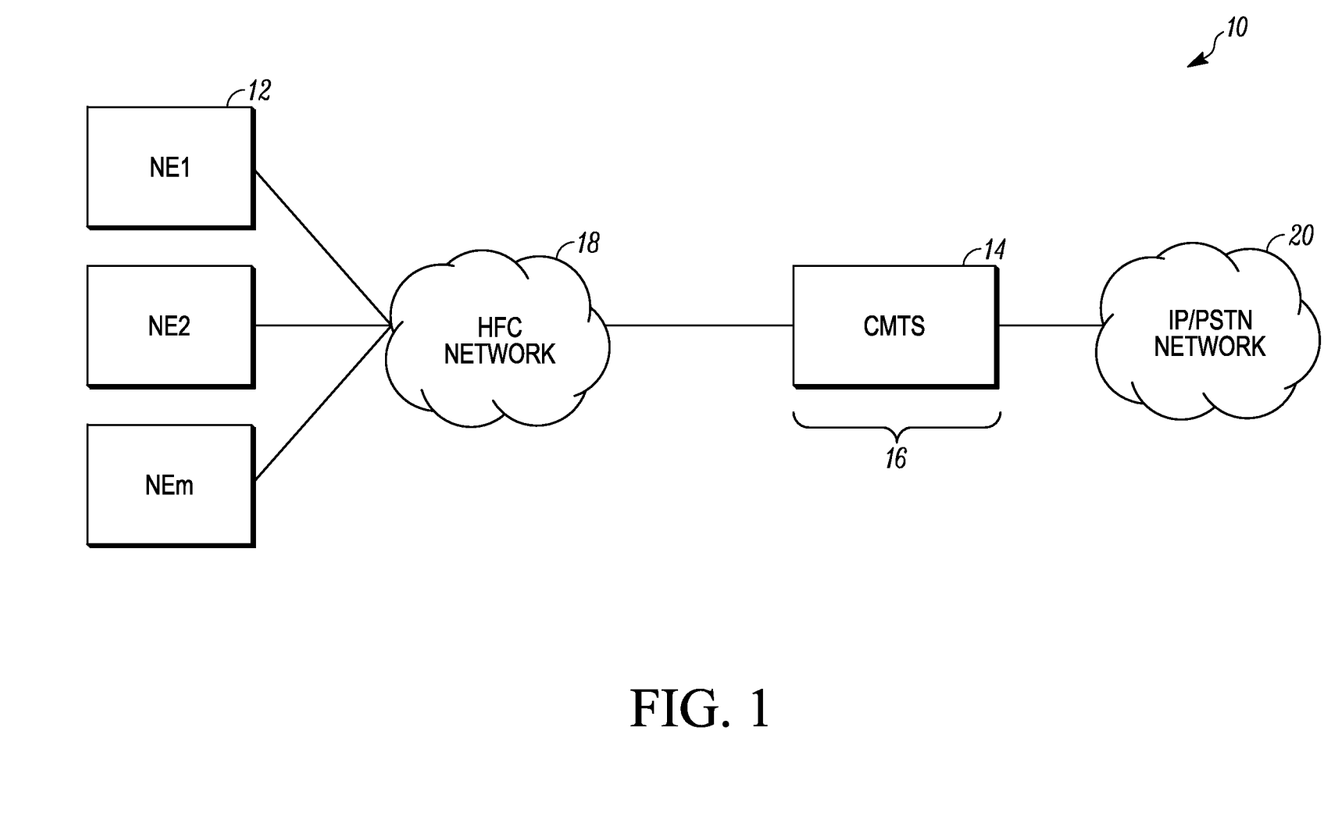
FIG. 1 illustrates an exemplary cable network system in accordance with an embodiment.

FIG. 1 illustrates an exemplary network 10 in which a plurality of network elements 12 (e.g. cable modems, set top boxes, televisions equipped with set top boxes, or any other network element) are connected to a Cable Modem Termination System (CMTS) 14 at the headend 16 of the network 10. Each network element 12 may connect to the CMTS 14 through a cascade of Hybrid Fiber Coax (HFC) components including taps, passives, cabling, nodes, and Radio Frequency (RF) amplifiers indicated as HFC network 18 in FIG. 1. In a typical network 10, the CMTS 14 will be connected to a plurality of network taps, each of which are connected to a plurality of network elements 12 such that the CMTS 14 may serve and communicate with many hundreds or more of network elements 12. At the headend, the CMTS 14 may also be connected to numerous program providers, television networks and stations, Internet broadcasters/service providers, and the like 20 for providing content to the network elements 12. Transmission of signals from the CMTS 14 to the network elements 12 are considered downstream transmissions and signal transmissions from a network element 12 to the CMTS 14, which are burst type transmissions as discussed above, are considered upstream transmissions.

Figure 2:
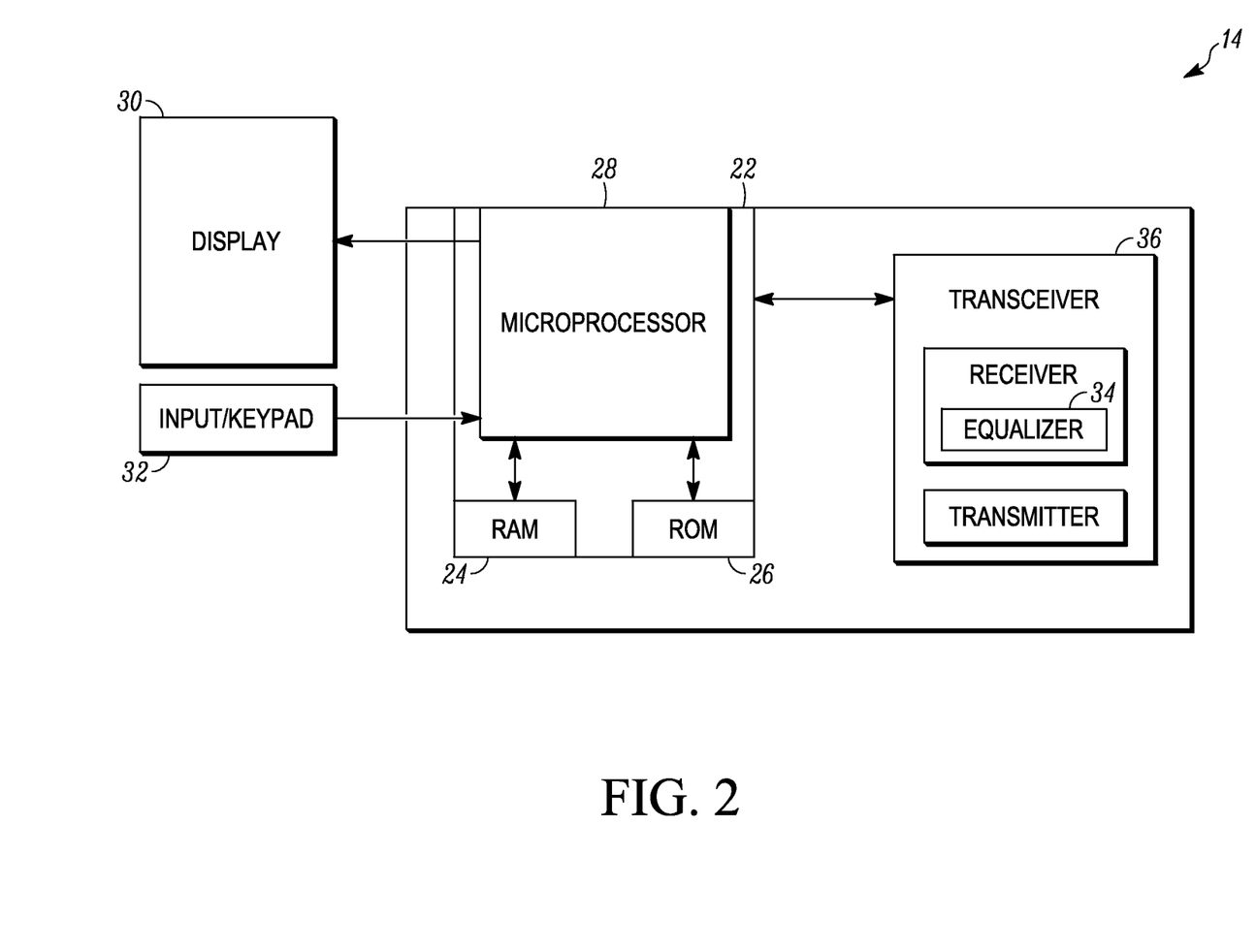
FIG. 2 illustrates an exemplary CMTS architecture including an adaptive equalizer in accordance with an embodiment.

FIG. 2 illustrates a logical architecture of an exemplary CMTS 14 which may have a processing unit 22 that may control the operation of the CMTS 14 and may have access to a RAM 24 and a ROM 26 of the like. Processing unit 22 may have a microprocessor 28 which may receive information, such as instructions and data, from the ROM 26 or the RAM 24. The processing unit 22 may be connected to a display 30 for displaying status and other information and an input keypad 32 for permitting an operator to provide instructions, processing requests, and/or data to the processing unit 22.

The CMTS 14 may have an adaptive equalizer, or equalizer unit, 34 associated with a transmitter/receiver or transceiver unit 36 which may provide bi-directional communication with a plurality of the network elements 12 through a plurality of the network taps within the HFC network 18. The CMTS 14 may contain a plurality of transceiver units 36, such as eight or more transceiver units 36, each supporting about 100 or more network elements 12. The transceiver unit 36 can be used to obtain measurements of impairments and distortion experienced on the communications channel and to acquire equalization coefficient updates for network elements 12 from the equalizer unit 34. The equalizer unit 34 may be in the form of a circuit embedded within the CMTS receiver or the like in the CMTS 14 that is able to create a digital filter for each network element for compensating for previously measured linear channel impairments.

The equalization coefficients needed to be sent to the network element 12 to create the required digital filter is derived from measurements relating to impairments affecting transmissions received by the CMTS 14 from the network element 12. By way of example, the CMTS 14 may develop the equalization coefficients based on measurements of distortion obtained via network element Station Maintenance (SM) bursts received by the CMTS 14 during periodic ranging requests. The equalization coefficients developed by the equalizer unit 34 of the CMTS 14 are then sent to the network element 12 in a ranging response message to the network element 12 for purposes of updating the equalization coefficients used by the network element 12. Periodic ranging may occur relatively frequently at about every 30 seconds or about every 10 to 20 seconds.

Figure 3:
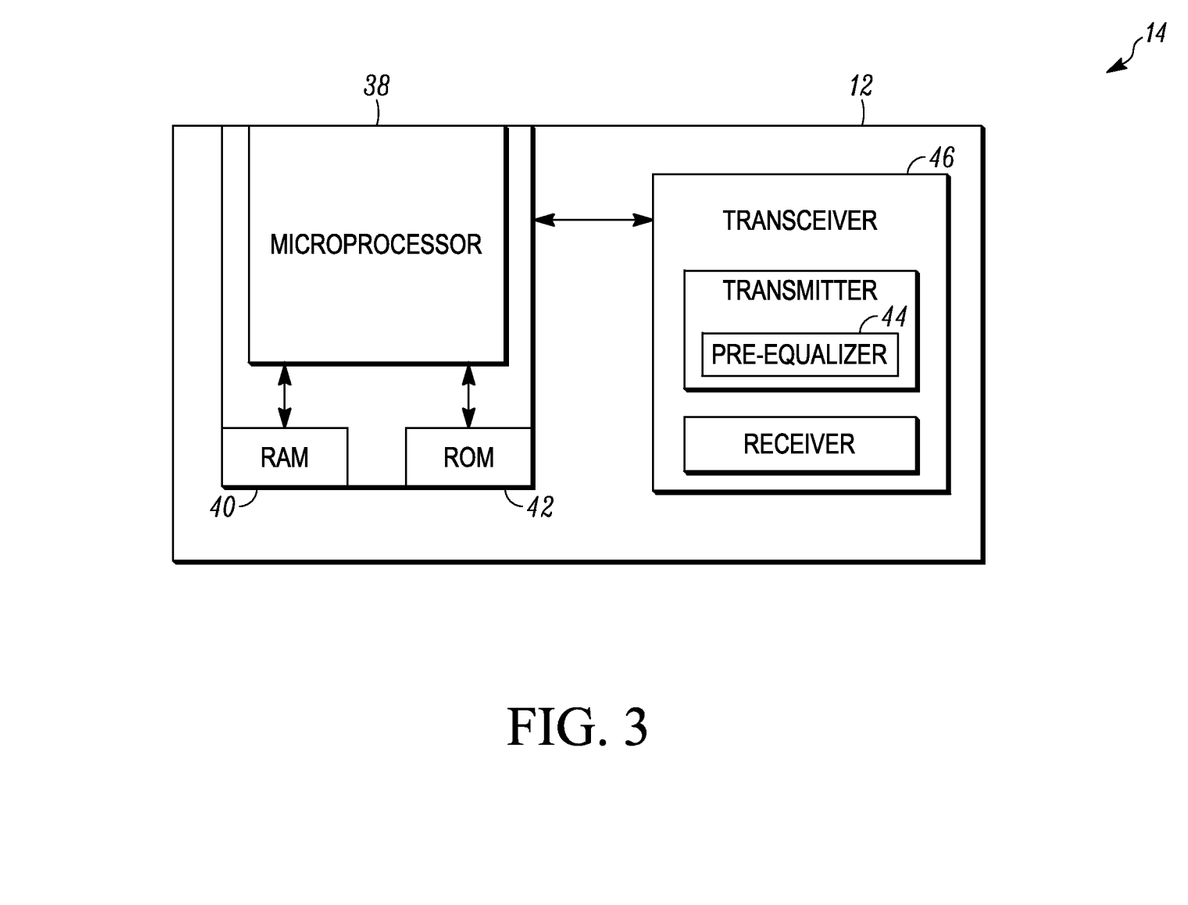
FIG. 3 illustrates an architecture of an exemplary network element which may communicate with the CMTS and which has an adaptive pre-equalizer in accordance with an embodiment.

FIG. 3 illustrates an exemplary network element 12, such as a cable modem or like subscriber device capable of communicating with the CMTS 14. The network element 12 may contain a processor unit 38 which may communicate with a RAM 40 and ROM 42 or the like and which controls the general operation of the network element 12. The network element 12 has an adaptive pre-equalizer 44 associated with a transmitter of the transmitter/receiver or transceiver unit 46 which provides bi-directional communication with the CMTS 14. The adaptive pre-equalizer 44 may be in the form of a circuit or the like in the network element 12 and may be set to pre-equalize or pre-distort upstream signals transmitted from the network element 12 to the CMTS 14.

As previously discussed, a single impulse noise or transient impairment event occurring on the communications channel during measurements of distortion taken by the CMTS 14 can greatly affect the definition of the digital filter developed by the equalizer unit 34 of the CMTS 14 that will ultimately be sent to the adaptive pre-equalizer 44 of the network element 12 and used during pre-equalization by the network element 12 during subsequent upstream transmissions. This influence can be significantly reduced or limited by modifying through scaling, downgrading, or reducing selected equalization coefficients to be transmitted as updates or by not transmitting updates to network elements 12 when impulse noise or like transient impairments are believed to have influenced the produced definition of the digital filter developed by the CMTS 14.

According to the DOCSIS pre-equalization approach, equalization coefficient updates derived by the CMTS 14 and sent to the subscriber network element 12 reflects a filter "update" and not a single filter load (i.e., full filter definition). Thus, the coefficient updates are "added" to the existing pre-equalization filter currently set in the network element to arrive at the new set of coefficients. This is accomplished via a process known as convolution.

If an impulse noise event occurs when the CMTS 14 is measuring distortion, then the changes to pre-equalizer filter developed by the equalizer unit 34 will be relatively large. Such an update developed and affected by the impulse noise will actually degrade communication performance when it is applied and put into use by the adaptive pre-equalizer 44 of the network element 12 since impulse noise is a transient non-linear event introducing errors in the equalizer's estimation of linear distortion. During the subsequent time that the CMTS 14 measures the channel, it may be highly unlikely that another impulse noise event would occur at the same time; thus, the next update may accurately reflect the linear distortion conditions of the channel. However, by the time of the next update, the adaptive pre-equalizer 44 of the network element 12 may have too much estimation error to equalize properly resulting in transmission errors or may have exceeded the point of maximum correction and become unstable.

For purposes of preventing the above referenced problem, the equalizer unit 34 of the CMTS 14 can be designed to reduce or downscale the developed equalization coefficient updates to be sent to the subscriber network elements 12. This may occur for all such updates or only for updates believed to be obtained from distortion measurements believed to have been influenced by a transient impairment. In this manner, if the impairment is a sustained linear event, then subsequent updates will collectively add together and allow the system to properly compensate for the linear distortion. However, if the impairment is a temporary event (such as impulse noise), then the single event will not result in system degradation to the point that communications is lost. Subsequent updates will simply remove the affects of the single impulse event. As another alternative, any update calculation believed to have been influenced by a transient event can be prevented from being sent by the CMTS 14 to the network element 12.

In one contemplated embodiment, the magnitude of the equalization coefficients determined by the equalizer unit 34 of the CMTS 14 may always be scaled so as to reduce the total impact of any one pre-equalization update sent to the adaptive pre-equalizer 44 of the subscriber network element 12. In this approach, every update would be scaled down or reduced and every update would be sent.

The specifics of the scaling process can be as follows. The adaptive pre-equalizer 44 has a number of filter "taps" through which the modulated carrier signal of an upstream transmission is passed. One of the taps is designated the main tap, and the remaining taps are referred to as non-main taps. Each tap has both a real part and an imaginary part. Each real part and each imaginary part are assigned equalizer coefficients that are used to cancel interference within the modulated carrier signal. The adaptive pre-equalizer 44 for an ideal communications channel is one where the main tap complex coefficient is 1+0j and all other taps are 0+0j. When the equalizer is attempting to adjust for linear distortion, then energy will be present in the non-main tap (that is, it will be nonzero) and the main tap will be reduced in power. One simple implementation of the scaling process is to scale (such as by ½, ¼, ⅛, or 1/16) the power of each of the non main tap coefficients. In the implementation of this algorithm, the CMTS 14 will scale all of the coefficients except for the main tap for all equalization coefficient updates sent to all subscriber network elements.

Figure 4:
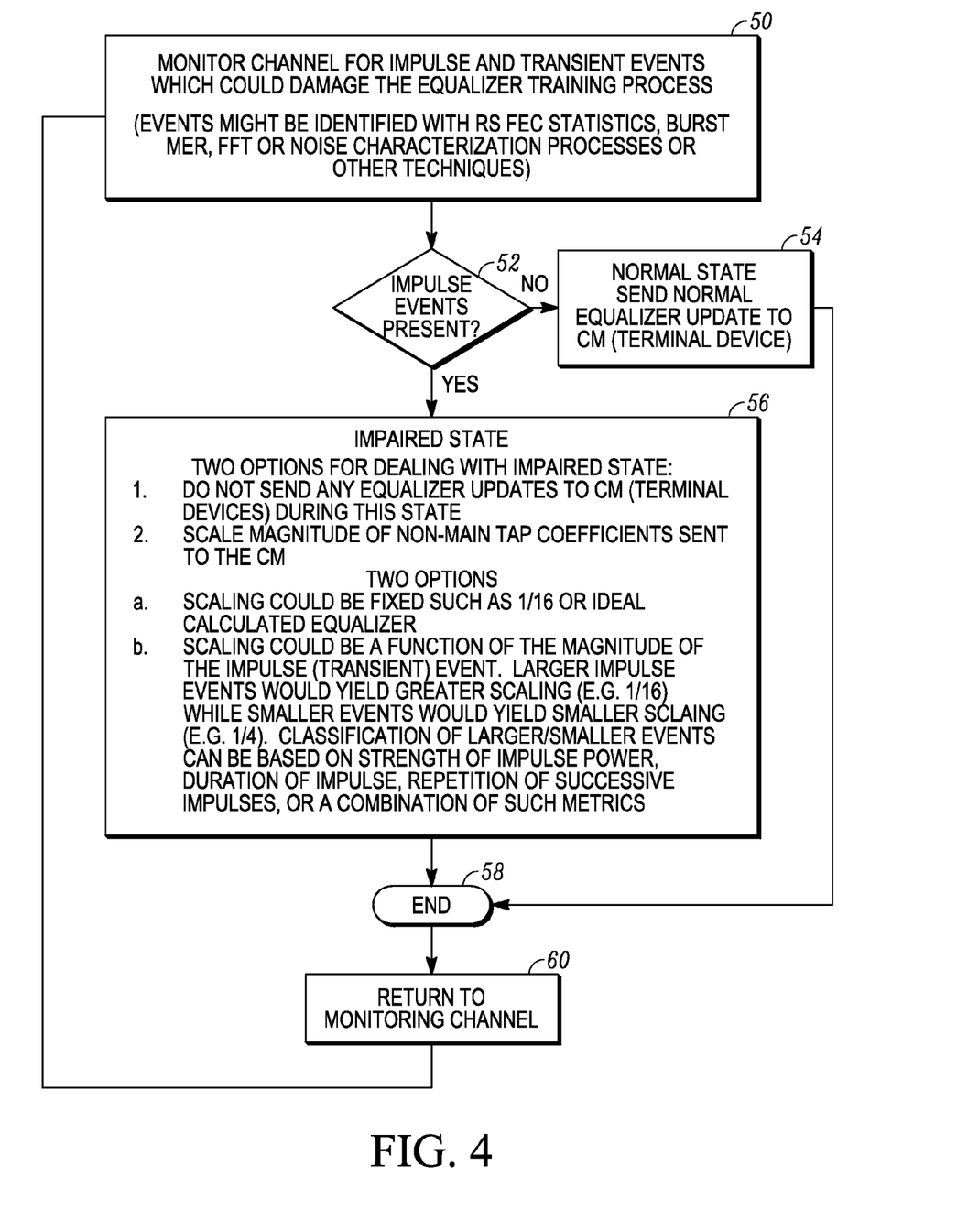
FIG. 4 is a flowchart that illustrates an adaptive process for updating equalization coefficients of an adaptive pre-equalizer of a network element in accordance with an embodiment.

According to another embodiment, which is best shown in FIG. 4, the scaling described above can be enabled and disabled at certain times and the amount or degree of scaling can be altered and automatically controlled. In this approach, the CMTS 14 attempts to determine when the communications channel is experiencing temporary noise events (such as impulse noise). During these events when detected by the CMTS 14, equalization coefficient updates are scaled by an adaptive amount or are not sent at all. Conversely, when impulse events are not present or detected by the CMTS 14, the equalization coefficients are sent without any scaling (i.e., full scaling).

Referring more specifically to FIG. 4, a first step 50 of this equalization approach is to monitor the communications channel between the CMTS 14 and a selected network element 12 with the CMTS 14 for impulse noise and transient impairments that may damage the pre-equalization process. At step 52, a decision is made by the CMTS 14 as to whether an impulse noise or other transient impairment event occurred or is present during the measurement of distortion. If no such event is believed present, the process moves forward in a "Normal State" mode of operation at step 54 in which the CMTS 14 sends an equalization coefficient update which is not scaled to the network element 12 for use by the adaptive pre-equalizer 44 during subsequent upstream data burst transmissions. Alternatively, if an impulse noise or other transient impairment event is believed present, the process moves forward in an "Impaired State" mode of operation at step 56. A first option for step 56 is to avoid sending any updates developed during the Impaired State. Thus, after step 54 or 56, the update process terminates at step 58 and the CMTS 14 returns to a mode in which it continues to monitor the communications channel in step 60 and returns to step 50 for the next update procedure.

As an alternative to not sending updates when in the Impaired State of step 56, the equalization coefficients can be subject to scaling, as described above, and sent to the network element 12 for being applied to the adaptive pre-equalizer 44. If such scaling is provided, the equalization coefficient updates may be scaled by a fixed value, such as by a factor of one-sixteenth (1/16) or some other desired scaling amount. As another alternative, the degree of scaling can be determined based on the magnitude of the impulse noise or transient impairment event measured during the monitoring step 50. The transient magnitude of the impulse noise or transient impairment may be accessed based on the magnitude of interference power, impulse duration, duty cycle, or a combination thereof. For instance, a larger measured impulse noise event may result in the use of greater scaling, such as by a factor of one-sixteenth (1/16), and a smaller measured impulse noise event may result in the use of a smaller scaling value, such as by a factor of one-fourth (1/4). Classification of larger and smaller impulse events can be based on metrics, such as, the strength of the impulse (power), duration of the impulse, repetition of successive impulses, or some combination of these metrics. Thus, the degree of scaling can be determined based upon the magnitude of the impulse/transient event thereby enabling updates to continue to be sent to the network element 12 despite the known occurrence of an impulse/transient event which may have affected the update determination.

With respect to determining the intervals when transient (impulse noise) events are present on the communications channel in steps 50 and 52, there are several contemplated options. For instance, the CMTS 12 can be used to monitor upstream modem Modulation Error Rate (MER). MER is the ratio of average symbol power to average error power, and the higher the MER, the cleaner the received signal. Another example is to take idle-period noise measurements. As another option, "equalizer stress" which is assessed by the variability of correction developed by the equalizer unit 34 of the CMTS 14 can be monitored. Here, a non-main tap to total energy ratio (NMTER) could be used as a metric for determining equalizer stress.

Yet another option is to monitor Forward Error Correction (FEC) statistics which are typically good indicators of transient impulse events. Specifically, monitoring the RS FEC corrected or errored codeword statistics provides a ready means for determining intervals when scaling should be enabled or a degree of scaling should be increased. Still further, significant degradation in the single unique burst MER when CMTS equalization adaptation is performed (Initial Maintenance (IM) and Station Maintenance (SM) in the case of the DOCSIS specification) could be used to yield a good indicator of impulse issues. Thus, any of the above techniques or others could be used by the CMTS 14 to identify impulse noise or transient impairment events.

For purposes of providing a specific example, the following algorithm can be used in steps 50 and 52 for purposes of determining whether or not an impulse noise or transient impairment event is present on the channel. The sample process assesses equalizer stress and is defined as follows:

(1) Calculate NMTER during each update interval;
(2) Hold a set of NMTER estimates for comparison to a threshold value;
(3a) If threshold from (2) is not exceeded by the set of NMTER estimates, allow full (non-scaled) correction;
(3b) If threshold from (2) is met or exceeded, hold set of NMTER estimates as threshold for comparison to the next set of NMTER estimates;
(4a) If threshold from (3b) is not exceeded by the next set of NMTER estimates, allow full (non-scaled) correction;
(4b) If threshold from (3b) is met or exceeded, withhold correction or send modified (scaled) correction.

Figure 5:
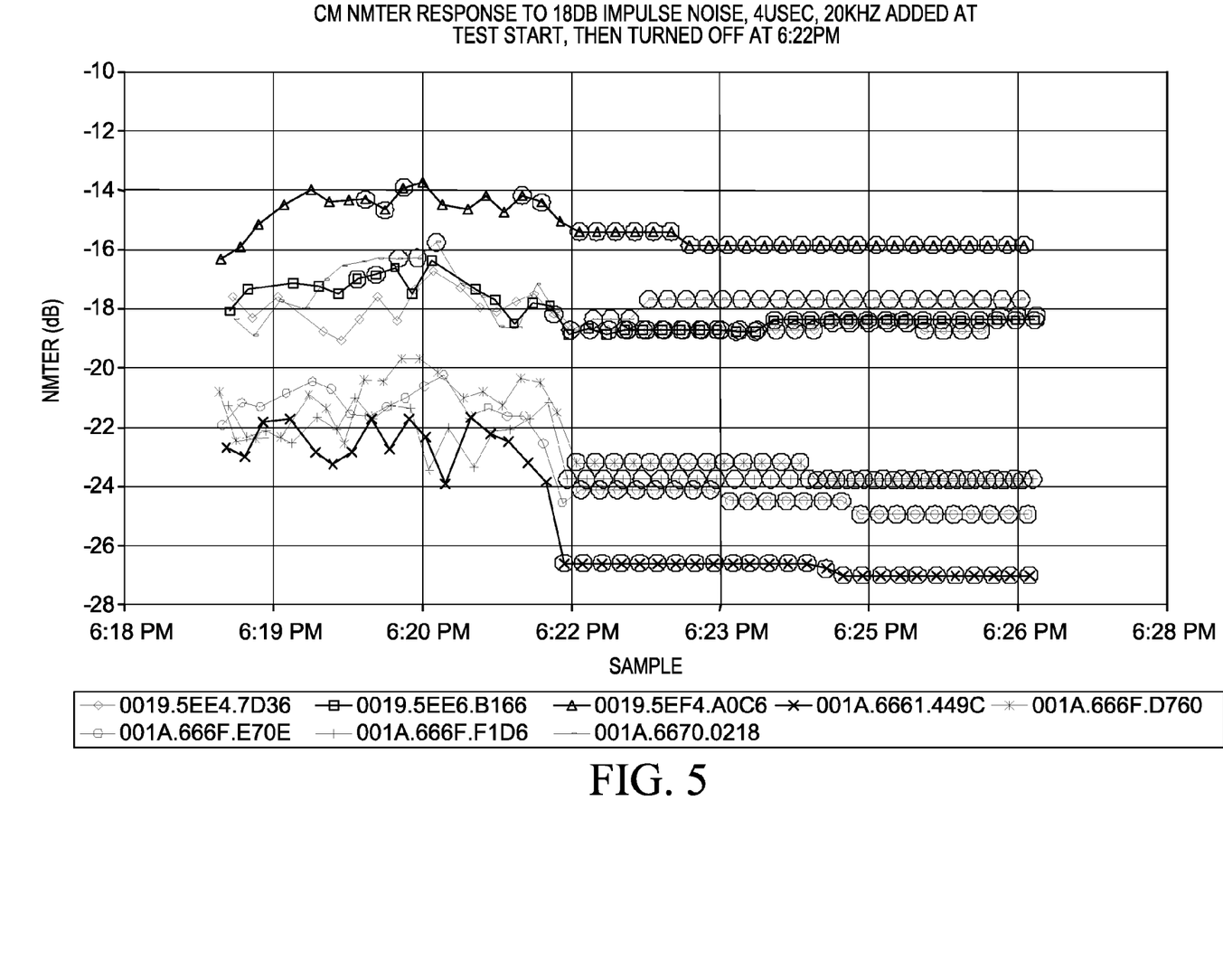
FIG. 5 is a graph showing the results of the adaptive process for a communication channel impaired temporarily by impulse noise in accordance with an embodiment.

FIG. 5 is a graph illustrating an implementation of the above referenced algorithm where NMTER for multiple DOCSIS subscriber links are impaired by impulse noise. Impulse noise corrupts the equalization process, impairing its ability to compensate for legitimate impairments, i.e. linear distortion. In FIG. 5, the x-axis of the graph is in units of time extending from 6:18 pm to 6:28 pm, and the y-axis is NMTER in units of dBs. The graph shows these measurements during this period for eight different subscriber modems. An impulse noise event of 18 dB is present on all the links for the first few minutes shown on the graph. The impulse noise impairment is turned off at approximately 6:22 pm. Thus, no impulse noise is present after about 6:22 pm. Each data point shown on the graph corresponds to a NMTER measurement for the particular link and where a determination is made to send or not send/scale an equalization coefficient update. There are approximately eight data points per minute for each of the modems.

Updates developed by the CMTS 14 at each data point on FIG. 5 that are permitted to be sent to the subscriber modems are those data points which are shown as circled in FIG. 5. Note that after about 6:22 pm, all data points are circled and thus all updates were sent from the CMTS 14 to the network elements 12 during this period. However, updates at data points that are not sent or are scaled before being sent correspond to data points that are not circled in FIG. 5. As shown, there are appreciably less unscaled corrections passed onto the cable modems in the presence of severe (18 dB) impulse noise impairment, the time leading up to 6:22 pm. The updates at the un-circled data points would either be scaled before being sent or withheld from the cable modems for purposes of stabilizing DOCSIS link performance in the presence of the impulse noise impairment.

Figure 6:
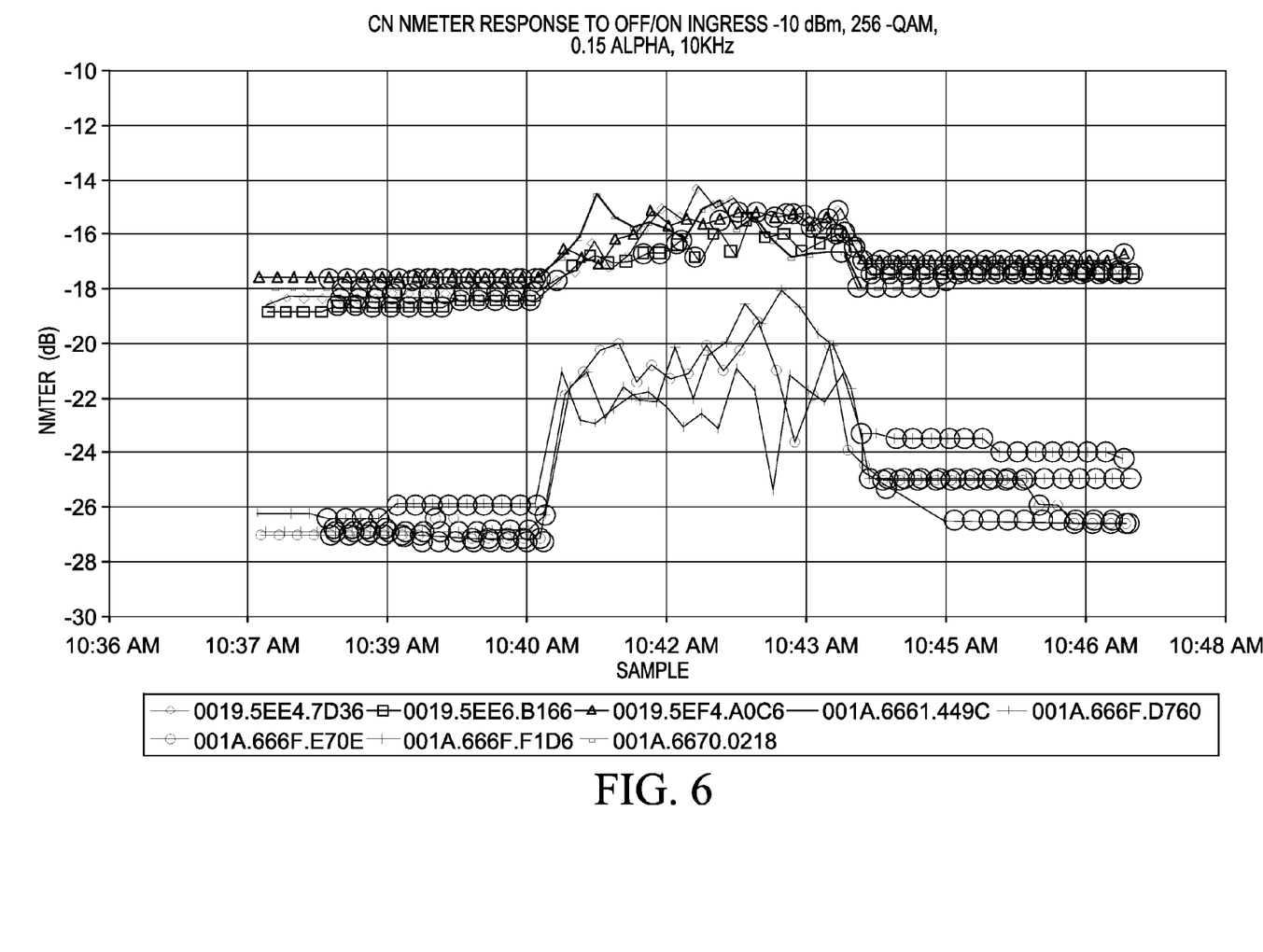
FIG. 6 is a graph showing the results of the adaptive process for a communication channel impaired temporarily by narrowband interference in accordance with an embodiment.

FIG. 6 is a graph similar to FIG. 5 discussed above. FIG. 6 illustrates an implementation of the above referenced algorithm where NMTER for multiple DOCSIS subscriber links are impaired by narrowband interference. Narrowband interference also corrupts the equalization process, impairing the ability to compensate for legitimate impairments, i.e. linear distortion. In this scenario, the interference is turned on between 10:40 am and 10:44 am, and off for all other data points. Each data point shown on the graph of FIG. 6 corresponds to a NMTER measurement for the particular link and where a determination is made to send or not send (or send as scaled) an equalization coefficient update. Updates that are permitted to be sent to the subscriber modems without scaling are those data points which are circled. Updates that are not sent or are scaled before sending correspond to data points that are not circled. Significantly fewer data points are circled during the period of interference corruption thereby stabilizing DOCSIS link performance in the presence of narrowband interference impairments.

Figure 7:
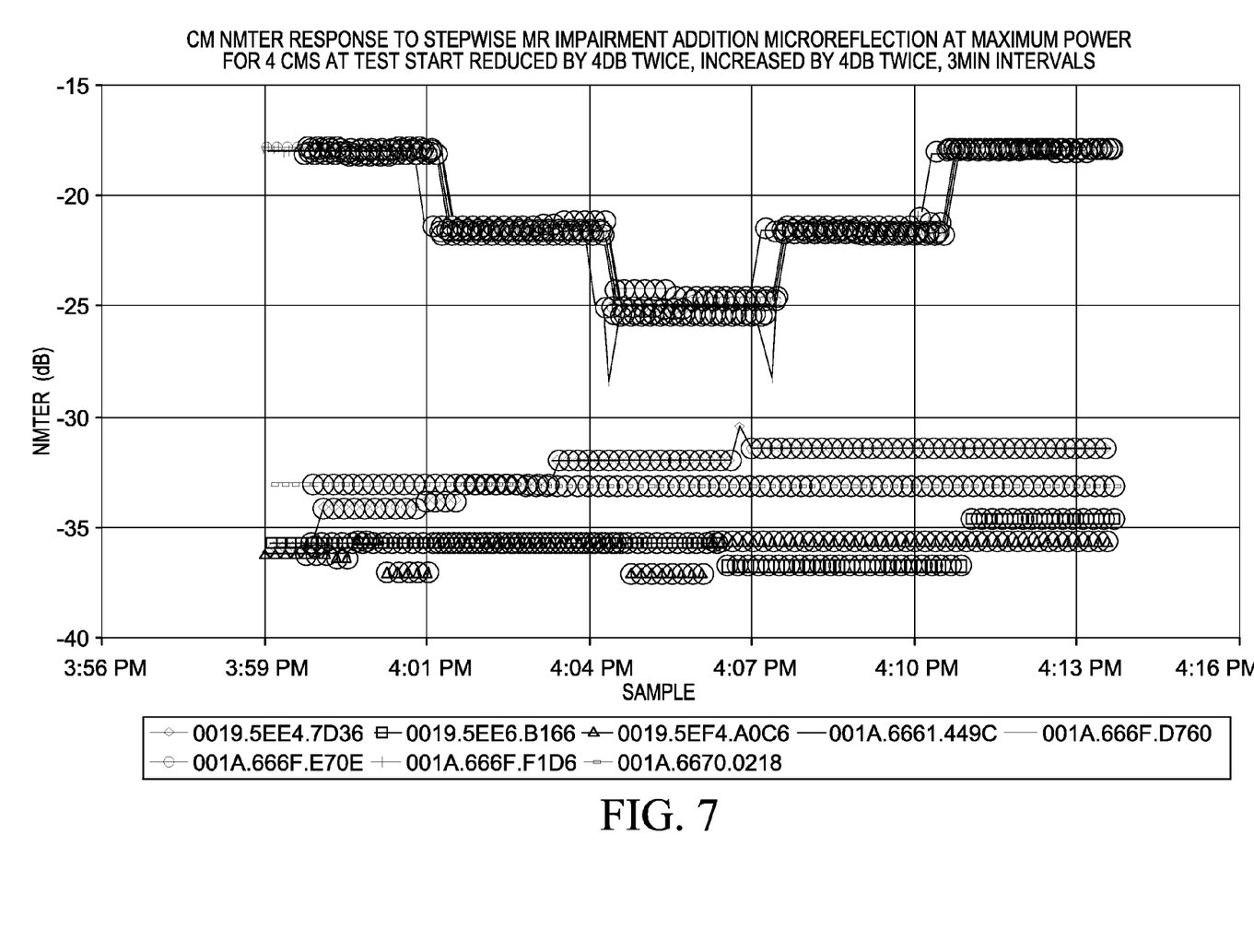
FIG. 7 is a graph showing the results of the adaptive process for a communication channel impaired by dynamic micro-reflection in accordance with an embodiment.

FIG. 7 is a graph similar to FIGS. 5 and 6. FIG. 7 illustrates an implementation of the above referenced algorithm where NMTER for multiple DOCSIS subscriber links are impaired by dynamic micro-reflection, a legitimate linear impairment. In this scenario, the micro-reflection intensity is changed over time. The micro-reflection intensity is twice reduced by 4 dB for four of the eight cable modem links shown on the graph and then twice increased by 4 dB for the four links in about three minute intervals. Each data point shown on the graph corresponds to a NMTER measurement for the particular link and where a determination is made to send or not send (or scale) an equalization coefficient update. Updates that are permitted to be sent without scaling to the subscriber modems are those data points which are circled. Updates that are not sent or are first scaled before sending correspond to data points in FIG. 7 that are not circled. Most data points representing times for equalization coefficient updates are circled during this scenario; whereby, full updates are communicated to the cable modems during this period and DOCSIS link performance remains unaffected in the presence of legitimate linear impairment.

The above referenced algorithm is provided as an example of how an adaptive and automated process may be implemented using physical link parameters. Equalizer correction/updates may be identified for further processing/scaling or withheld entirely to ensure DOCSIS link stability. Algorithms should modify or withhold coefficient updates that are corrupted by illegitimate impairments including impulse noise and narrowband interference. All corrections for legitimate impairments including micro-reflections, group delay variation, and amplitude distortion should be fully communicated to cable modems for optimal DOCSIS link performance and stability.

In addition or instead of sending, withholding from sending, or scaling equalization coefficient updates, the CMTS 14 can also send messages to networks elements 12 to cause the adaptive pre-equalizer 44 to perform other desired operations when the presence of a noise impulse or transient impairment is identified by the CMTS 14. For example, the CMTS 14 could forward an instruction to the network element 12 to perform a hard reset of the equalization coefficient values to stored values or to perform reset to the last set of equalization coefficient values that were known to function properly. Thus, if the CMTS 14 determines the presence of an impulse noise or transient impairment, the CMTS 14 in step 56 can send a reset or other instruction instead of or in place of an update. These instructions could be existing DOCSIS standard signaling, such as TLV4 and TLV5 modem configuration settings, and could be sent for the purpose of maintaining link stability while minimizing required convergence time of the equalization process.

The algorithm discussed above and the process shown in FIG. 4 may be implemented in hard wired devices, firmware or software running in a processor. A processing unit for a software or firmware implementation may be contained in the CMTS. The devices, units, and memory discussed above can physically be provided on a circuit board or within an electronic device and can include various processors, microprocessors, controllers, chips, disk drives, and the like.

While the principles of the invention have been described above in connection with specific devices, systems, and methods, it is to be clearly understood that this description is made only by way of example and not as limitation on the scope of the invention as defined in the appended claims.

We claim:

1. A method of updating equalization coefficients of an adaptive pre-equalizer of a network element, comprising the steps of:
    monitoring a communications channel to measure distortion of a communications signal received from the network element;
    detecting, during said monitoring step, whether a transient impairment is present in the communication signal;
    determining, after said monitoring step, pre-equalization coefficients based on the distortion measured during said monitoring step;
    when a transient impairment is not detected during said detecting step, transmitting, to the network element, a pre-equalization coefficient update with the pre-equalization coefficients determined during said determining step; and
    when a transient impairment is detected during said detecting step, modifying the pre-equalization coefficients determined during said determining step before transmitting a pre-equalization coefficient update with the pre-equalization coefficients, as modified, to the network element;
    wherein said steps of monitoring, detecting, determining, transmitting, and modifying and transmitting are performed by an electronic communications device having an equalizer unit.

2. A method according to claim 1, wherein said step of modifying the pre-equalization coefficients includes scaling at least some of the pre-equalizations determined during said determining step.

3. A method according to claim 2, wherein during said scaling step, at least some of the pre-equalization coefficients determined by said determining step are reduced by a scaling factor of less than 1.

4. A method according to claim 3, wherein a magnitude of the scaling factor is determined based on a magnitude of the transient impairment detected during said detecting step, and wherein the magnitude of the transient impairment detected during said detecting step is determined based on at least one of a strength of impulse power of the transient impairment, a duration of impulse of the transient impairment, and a repetition of successive impulses of the transient impairment.

5. A method according to claim 1, wherein said detecting step uses at least one of equalizer stress, non-main tap to total energy ratio (NMTER), Reed-Solomon Forward Error Correction (RS FEC) statistics, and burst Modulation Error Rate (MER) to determine whether a transient impairment is present in the communication signal.

6. A method according to claim 1, wherein after said monitoring, detecting, determining, and transmitting or modifying and transmitting steps are completed, the steps are repeated during a next time interval.

7. A method according to claim 1, wherein the transient impairment is at least one of impulse noise and narrowband interference.

8. A method according to claim 1, wherein the electronic communications device is a cable modem termination system (CMTS) and the network element is a cable modem.

9. An apparatus for communicating with a network element and for transmitting a pre-equalization coefficient update to the network element, comprising:
- an equalizer module configured to determine a pre-equalization coefficients for the network element from measurements of distortion taken by the apparatus from a communications signal received from the network element;
- the apparatus being configured to detect whether a transient impairment is present in the communication signal;
- the apparatus being configured to transmit a pre-equalization coefficient update to the network element in a normal state of operation when a transient impairment is not present; and
- the apparatus being configured to modify the pre-equalization coefficients with a scaling factor of less than one before transmitting a pre-equalization coefficient update to the network element or withhold from transmitting the pre-equalization coefficient update to the network element in an impaired state of operation when a transient impairment is detected to be present;
- the apparatus further comprising a transmitter and receiver unit configured to transmit signals to the network element and to receive signals from the network element via at least one communications channel; and
- the apparatus further comprising a processor unit having a microprocessor for controlling operation of said transmitter and receiver unit and said equalizer module, and wherein said equalizer module is configured to detect whether a transient impairment is present in the communication signal and to modify the pre-equalization coefficients with a scaling factor.

10. The apparatus according to claim 9, wherein the apparatus is configured to detect whether a transient impairment is present in the communication signal by monitoring at least one of equalizer stress, non-main tap to total energy ratio (NMTER), Reed-Solomon Forward Error Correction (RS FEC) statistics, and burst Modulation Error Rate (MER).

11. The apparatus according to claim 9, wherein the apparatus is a cable modem termination system (CMTS).

12. An apparatus for communicating with a network element and for transmitting a pre-equalization coefficient update to the network element, comprising:
- an equalizer module configured to determine a pre-equalization coefficients for the network element from measurements of distortion taken by the apparatus from a communications signal received from the network element;
- the apparatus being configured to detect whether a transient impairment is present in the communication signal;
- the apparatus being configured to transmit a pre-equalization coefficient update to the network element in a normal state of operation when a transient impairment is not present; and
- the apparatus being configured to modify the pre-equalization coefficients with a scaling factor of less than one before transmitting a pre-equalization coefficient update to the network element or withhold from transmitting the pre-equalization coefficient update to the network element in an impaired state of operation when a transient impairment is detected to be present;
wherein, during said impaired state of operation, the apparatus is configured to alter a magnitude of said scaling factor based on a magnitude of the transient impairment detected, and wherein said magnitude of the transient impairment detected is based on at least one of a strength of impulse power of the transient impairment, a duration of impulse of the transient impairment, and a repetition of successive impulses of the transient impairment.

\* \* \* \* \*